No. 826,529. PATENTED JULY 24, 1906.
W. D. BALDWIN & J. D. IHLDER.
AUTOMATIC STOP FOR WHIP HOISTS.
APPLICATION FILED MAR. 21, 1904.

2 SHEETS—SHEET 2.

Witnesses
Henry E. Kirby
Timothy J. Lane

William D. Baldwin
and John D. Ihlder
Inventors

By their Attorney E. W. Marshall

UNITED STATES PATENT OFFICE.

WILLIAM D. BALDWIN, OF NEW YORK, AND JOHN D. IHLDER, OF YONKERS, NEW YORK, ASSIGNORS TO OTIS ELEVATOR COMPANY, OF EAST ORANGE, NEW JERSEY, A CORPORATION OF NEW JERSEY.

AUTOMATIC STOP FOR WHIP-HOISTS.

No. 826,529.  Specification of Letters Patent.  Patented July 24, 1906.

Application filed March 21, 1904. Serial No. 199,164.

*To all whom it may concern:*

Be it known that we, WILLIAM D. BALDWIN, residing at New York city, in the county of New York, and JOHN D. IHLDER, residing at Yonkers, in the county of Westchester, State of New York, citizens of the United States, have invented certain new and useful Improvements in Automatic Stops for Whip-Hoists, of which the following is a specification.

Our invention relates to automatic stops for electric whip-hoists; and its object is to prevent such machines from carrying their loads beyond the proper limits of travel and to provide means for avoiding such accidents as might occur from overwinding.

We will describe a whip-hoist comprising our invention and point out the novel features thereof in claims.

Figure 1:
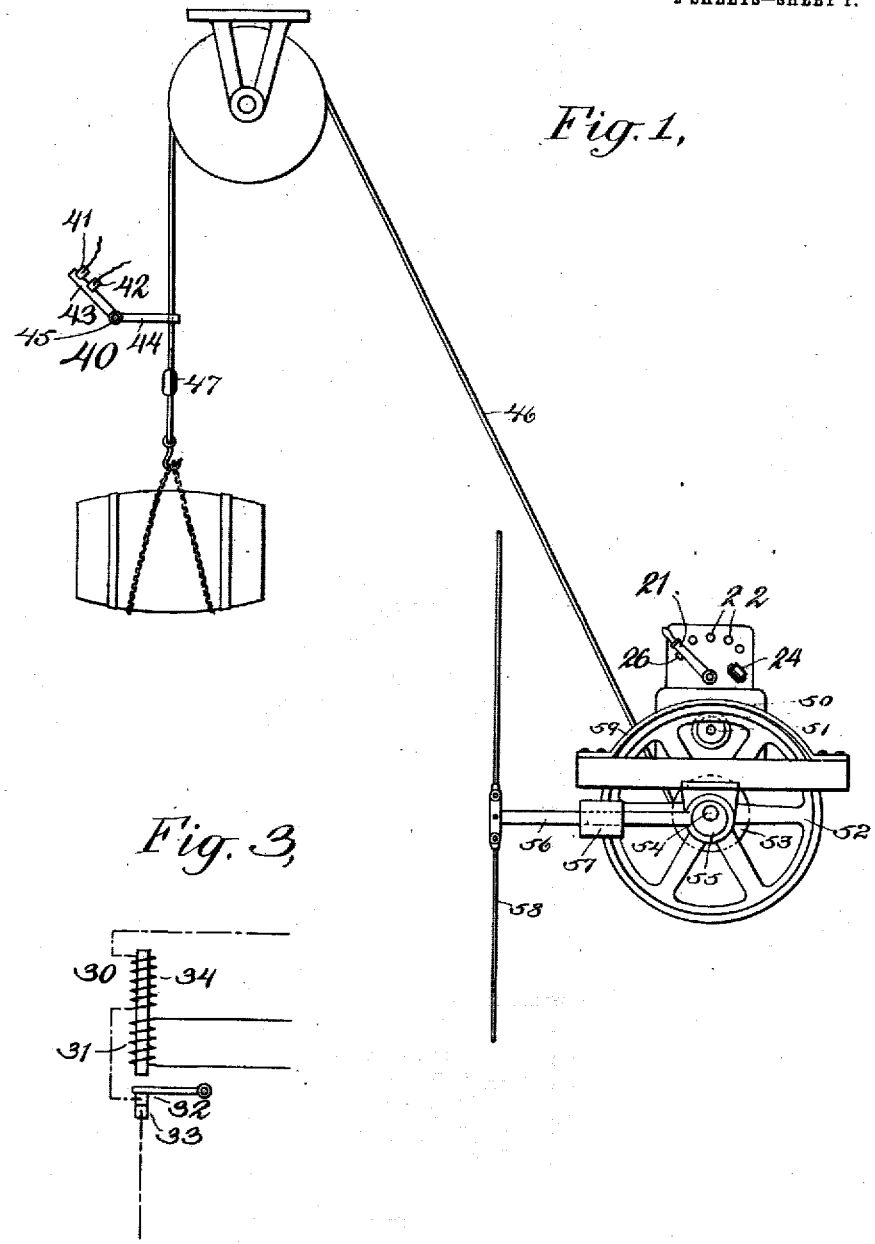
Figure 2:
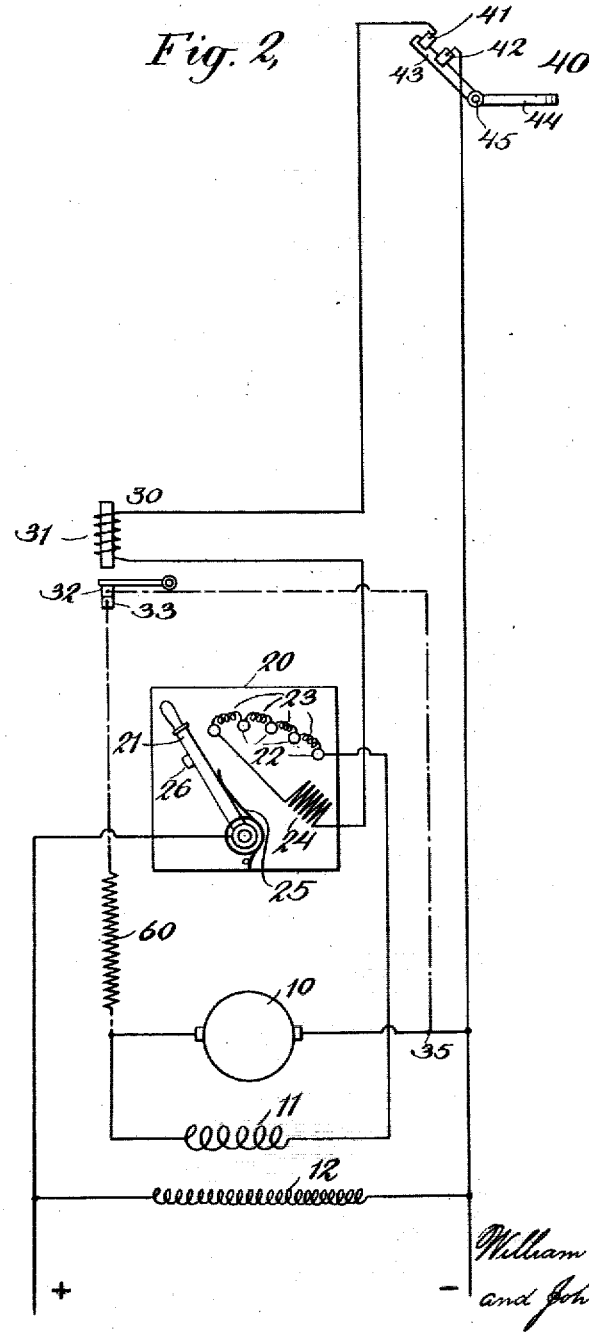

Referring to the drawings, Figure 1 is a side elevation of a whip-hoist, showing the mechanical features of the present invention. Fig. 2 is a wiring diagram, showing the electrical connections of a whip-hoist embodying our invention. Fig. 3 is a diagram of a part of the apparatus shown in Fig. 2, but with its circuits somewhat changed to show a modification of the invention.

Like figures of reference indicate corresponding parts in the various figures.

50 designates an electric motor, to the shaft of which is securely attached a friction-pinion 51. This pinion is adapted to coact with a friction-sheave 52. A winding-drum or windlass is attached to a shaft 54, to which the friction-sheave 52 is also attached. The shaft 54 is supported on an eccentric 55, which may be turned by means of a lever 56 to raise or lower the friction-wheel 52. The outer periphery of the friction-wheel 52 is smooth and is adapted when raised to come in contact with a brake-strap 59. The inside of the rim of the friction-wheel 52 is provided with friction-surfaces which are adapted when the sheave is lowered to coact with the friction-pinion 51, so that the sheave 52, and consequently the drum 53, will be driven by the pinion when the latter is rotating. The lever 56 may be operated directly by hand or may be operated from a distance by means of a rope 58 connected to it. A weight 57 may be attached to the lever 56 to facilitate the operation of the apparatus.

20 designates a starting-controller for the motor. It is of a well-known type. It comprises a hand-lever 21, which is connected to one of the mains from a source of electrical supply, in this case the positive main, which is designated by + in the drawings. This hand-lever is held in the position shown against a stop 26 by means of a spring 25. When it is desired to start the motor, the hand-lever 21 is moved to the right. It then establishes a circuit through the contacts 22, the resistance-coils 23, the series field 11, and the armature 10 of the motor to the negative main. The shunt-field 12 of the motor, as here shown, is connected directly across the mains. As the hand-lever 21 is moved farther to the right it cuts out the starting resistance 23 step by step until it reaches the last contact 22, when it is all cut out. The hand-lever also establishes another circuit through a holding-magnet 24, the coil of an auxiliary magnet 30, a limit-switch 40 to the negative main. While an electric current flows through this circuit it energizes the two magnets in it. The first of these (the holding-magnet 24) holds the lever 21 over to the right against the action of the spring 25. The auxiliary magnet 30 separates its contacts 32 33 and breaks what would otherwise be a short circuit across the motor-armature through a resistance 60. This short circuit is shown in the drawings by a broken line made up of dots and dashes. After the motor has been started, as has just been described, it will continue to rotate as long as its circuits are not interrupted. This will impart motion to the friction-pinion 51, and the apparatus may be used for raising and lowering packages at will.

The rope or cable 46, which is used to connect packages to the drum 53, is provided with a stop-ball 47 near its end. This rope is run through or near an arm 44 of the limit-switch 40 and is so arranged that it passes the arm 44 freely, but that the stop-ball 47 will engage the arm 44 and raise the latter if it runs against it. The arm 44 is pivoted at 45. Its other end 43 forms the movable blade of an electric switch and normally touches the stationary contacts 41 42 and completes the circuit through the holding magnet 24 and the auxiliary magnet-coil 31.

Whenever the stop-ball 47 engages the arm 44, as it will whenever it approaches the upper limit of its travel, it will push the latter up and the switch-blade 43 down, thus breaking the circuit between the contacts 41 and 42. This will interrupt the flow of current through the holding-magnet 24 and the auxiliary magnet 30, and they will be deënergized. The hand-lever 21 will now be thrown back against the stop 26 by the spring 25. This will cut off the supply of current from the mains to the armature and series fields of the motor, so that the motor will no longer be driven by the current. The contacts 32 33 of the auxiliary magnet 30 will come together, thus closing a short circuit across the armature 10 through the resistance 60. The current generated by the rotation of the armature flowing through this short circuit will act as a brake and tend to stop the motor and bring the apparatus to rest.

We will now describe the modification illustrated in Fig. 3. In this case the auxiliary magnet 30 has the same contacts 32 33 and the same coil 31 as before, but it has another coil 34 added, which is in the circuit containing the resistance 60 and which when the contacts 32 33 are together short-circuits the motor-armature. The coil 34 is arranged to counteract the effect of coil 31, so that when both coils are excited the magnet 30 will not be energized and its contacts 32 33 will remain together. The object and purpose of this arrangement is to prevent the load descending too rapidly. This might happen if after the motor had stopped, as above described, the load should descend and the limit-switch 40 should close again, for then the load would drive the motor and the current generated by the motor-armature would energize the auxiliary magnet 30 and cause the latter to break at 32 33 the armature short circuit. This would allow the motor to rotate freely and the load to run down with but little retardation and with a possibility of injuring itself when it strikes bottom. This trouble can be overcome by arranging the auxiliary switch 40 to remain open after it has been opened by the stop-ball 47 until it is closed by hand; but as this switch is often in an inaccessible place we sometimes use a switch which closes itself as soon as the stop-ball moves away from it. In such a case if the load is heavy enough to drive the motor the latter will energize the armature short circuit and allow the load to run down freely; but the coil 34, which is in the armature short circuit, is added to the magnet 30 to neutralize the effect of the coil 31, so that the magnet 30 will not break the short circuit while the motor is generating current. Thus the load will run down slowly, retarded by the braking effect of the short circuit on the armature, and will be protected from injuries due to its too rapid descent. The coil 34 will not prevent the magnet 30 from becoming energized by the coil 31 when the motor is started up, because the coil 31 receives its full current strength as soon as the hand-lever 21 touches the first stationary contact 22, and at that time the coil 34 is short-circuited by the motor-armature. The auxiliary magnet will at once separate its contacts 32 33 and break the circuit to the coil 34.

Having described our invention, what we claim is—

1. The combination with a whip-hoist driven by an electric motor, of a source of electrical supply, a rope to connect a load to the hoist, a switch in the path of the rope and arranged to be opened by the latter when its end approaches the limit of its travel, said switch controlling the circuit of a holding-magnet which when broken cuts off the electrical supply from the motor, also controlling the circuit of an auxiliary magnet which when broken establishes a short circuit through resistance across the motor-armature.

2. The combination with a whip-hoist comprising a motor, a starting-rheostat, a drum, gearing connecting the motor and the drum, and a rope to connect a load to the drum, of a source of electrical supply, a switch in the path of the rope and arranged to be opened by the latter when its end approaches the limit of its travel, said switch controlling the circuit of a holding-magnet which when broken cuts off the electrical supply from the motor, also controlling the circuit of an auxiliary magnet which when broken establishes a short circuit through resistance across the motor-armature.

3. The combination with a whip-hoist comprising a motor, a starting-rheostat, a drum, gearing connecting the motor and the drum, and a rope coacting with the drum and having a stop-ball attached near one end, of a source of electrical supply, a switch in the path of the rope, arranged to be opened by the stop-ball on the rope, said switch controlling the circuit of a holding-magnet which when broken cuts off the electrical supply from the motor, also controlling the circuit of an auxiliary magnet which when broken establishes a short circuit through resistance across the motor-armature.

4. The combination of a whip-hoist driven by an electric motor, of a source of electrical supply, a rope to connect a load to the hoist, a switch in the path of the rope and arranged to be opened by the latter when its end approaches the limit of its travel, said switch controlling the circuit of a holding-magnet which when broken cuts off the electrical supply from the motor, also controlling the circuit of a coil on an auxiliary magnet which when broken establishes a short circuit through resistance across the motor-armature, another coil on said auxiliary magnet connected in the armature short circuit and arranged to neutralize the effect of the first coil.

In testimony whereof we have signed our names to this specification in the presence of two subscribing witnesses.

WM. D. BALDWIN.
JOHN D. IHLDER.

Witnesses:
 THOS. M. LOGAN,
 ERNEST W. MARSHALL.